(12) United States Patent
Kamishima et al.

(10) Patent No.: US 7,325,665 B2
(45) Date of Patent: Feb. 5, 2008

(54) CONTROL APPARATUS AND CONTROL METHOD FOR AUTOMATIC TRANSMISSION

(75) Inventors: Hirofumi Kamishima, Toyota (JP); Takanori Sakamoto, Toyota (JP); Tadayuki Nagai, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 197 days.

(21) Appl. No.: 11/248,265

(22) Filed: Oct. 13, 2005

(65) Prior Publication Data

US 2006/0089237 A1   Apr. 27, 2006

(30) Foreign Application Priority Data

Oct. 27, 2004   (JP) .............................. 2004-312696

(51) Int. Cl.
*B60W 10/10*   (2006.01)
*B60W 10/18*   (2006.01)

(52) U.S. Cl. ..................................... 192/220.1; 477/171

(58) Field of Classification Search ................ 477/170, 477/171; 192/220, 220.1

See application file for complete search history.

(56) References Cited

U.S. PATENT DOCUMENTS 4,088,208 A * 5/1978 Goode ...................... 192/220.1
2002/0074207 A1* 6/2002 Kupper et al. ........... 192/220.1

FOREIGN PATENT DOCUMENTS

JP   5-87236   4/1993

* cited by examiner

*Primary Examiner*—Sherry Estremsky
*Assistant Examiner*—Edwin A Young
(74) *Attorney, Agent, or Firm*—Oblon, Spivak, McClelland, Maier & Neustadt, P.C.

(57) ABSTRACT

The ECT_ECU performs a step of determining that an ON failure has occurred in a depressing force switch when the depressing force switch is turned ON while a brake lamp switch is OFF, and setting a flag F; a step of determining whether the brake lamp switch, which is turned OFF at a position on a release side with respect to a depressing force switch setting position, has been turned OFF, when the flag F has been set; and a step of increasing commanded pressure for engaging an input clutch as rapidly as possible, when the brake lamp switch has been turned OFF.

11 Claims, 13 Drawing Sheets

FIG. 2

|  | C1 | C2 | C3 | C4 | B1 | B2 | B3 | B4 | F0 | F1 | F2 | F3 |
|---|---|---|---|---|---|---|---|---|---|---|---|---|
| P |  |  |  |  |  |  |  |  |  |  |  |  |
| R |  |  | ○ |  | ◎ |  |  | ○ |  | ○ |  |  |
| N |  |  |  |  |  |  |  |  |  |  |  |  |
| 1st | ○ |  |  | ◎ |  |  | ○ | ◎ | ○ |  |  | ○ |
| 2nd | ○ |  |  | ◎ | ◎ | ◎ | △ |  | ○ | ○ | ○ |  |
| 3rd | ○ |  | △ | ◎ |  |  | △ |  | ○ | ○ |  |  |
| 4th | ○ | ○ | ○ | ◎ |  |  | △ |  | ○ |  |  |  |
| 5th | △ | ○ |  |  | ○ |  | △ |  |  |  |  |  |
| 6th | △ | ○ |  |  | △ | ○ | △ |  |  |  |  |  |

○ ENGAGED
◎ ENGAGED WHEN ENGINE BRAKE IS APPLIED
△ ENGAGED STATE WITH NO POWER TRANSMISSION

FIG.5

|     | BRAKE LAMP SWITCH | DEPRESSING FORCE SWITCH |
| --- | --- | --- |
| (1) | OFF | OFF |
| (2) | ON  | OFF |
| (3) | ON  | ON  |

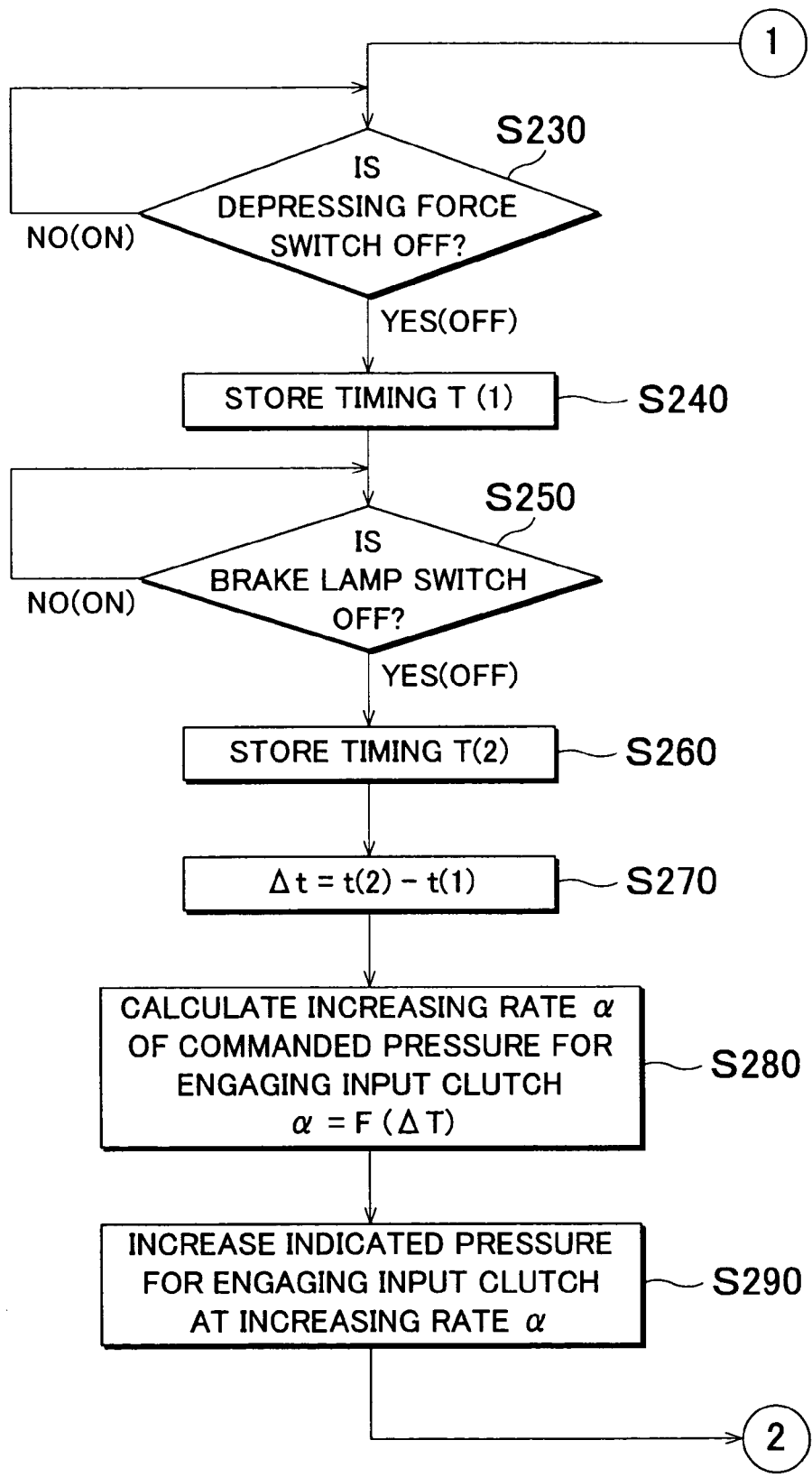

CONTROL APPARATUS AND CONTROL METHOD FOR AUTOMATIC TRANSMISSION

INCORPORATION BY REFERENCE

The disclosure of Japanese Patent Application No. 2004-312696 filed on Oct. 27, 2004 including the specification, drawings and abstract is incorporated herein by reference in its entirety.

BACKGROUND OF THE INVENTION

1. Field of the Invention

The invention relates to a control apparatus and control method for an automatic transmission. More specifically, the invention relates to a control apparatus and control method for an automatic transmission, which performs neutral control.

2. Description of the Related Art

An automatic transmission mounted in a vehicle includes a shifting mechanism which is connected to an engine via a torque converter and the like, and which includes plural power transmission paths. The automatic transmission is configured to automatically change the power transmission paths based on an accelerator pedal operation amount and a vehicle speed, namely, configured to automatically change speed ratios (shift speeds). Usually, the vehicle including the automatic transmission is provided with a shift lever operated by a driver. A shift position (e.g. a reverse running position, a neutral position, or a forward running position) is selected through an operation of the shift lever, and automatic shift control is performed among plural shift speeds corresponding to the selected shift position (usually, the forward running position).

When the vehicle including such an automatic transmission is at a standstill with the forward running position being selected, driving force from an engine running at idle is transmitted to the transmission via the torque converter and then transmitted to wheels, causing a so-called creep phenomenon. The creep phenomenon is highly useful under a predetermined condition. For example, the vehicle at a standstill on an uphill road can start smoothly due to the creep phenomenon. However, the creep phenomenon is not desired, when the vehicle needs to be kept at a standstill. Accordingly, in such a case, a brake of the vehicle is applied so that creeping force is suppressed. Namely, the creeping force from the engine is suppressed by the brake, causing a problem that fuel efficiency of the engine is reduced.

Therefore, a proposal has been made to improve the fuel efficiency in a state where the vehicle is at a standstill since the brake is applied by depressing a brake pedal and the accelerator pedal is substantially fully released when the forward running position is selected. It is proposed that the transmission be placed in a state close to the neutral state while the forward running position is selected so that fuel efficiency is improved. Namely, it is proposed that generation of the creeping force be prevented by placing the transmission in the state close to the neutral state.

Japanese Patent Application Publication No. JP 05-87236 A discloses a creep control apparatus for a vehicle, which prevents a vehicle from creeping when a predetermined condition is satisfied while the forward running position is selected. This creep control apparatus for a vehicle prevents the vehicle from creeping by achieving the neutral state, if a predetermined condition including a condition that a foot brake is depressed is satisfied, even when a shift range of the automatic transmission is set to a forward running range. The creep control apparatus includes a detection portion which detects an operation amount of the foot brake. A threshold value for the operation amount of the foot brake, which is used when creep prevention control is started, is set to a value larger than a threshold value for the operation amount of the foot brake, which is used when the control returns from the creep prevention control to normal control.

With this creep control apparatus for a vehicle, hysteresis of the operation amount of the brake is set when the creep prevention control is started and when the control returns from the creep prevention control to the normal control. Accordingly, it is possible to prevent the situation where the creep prevention control is started although the driver has no intention to start the creep prevention control. Also, the creep prevention control is started only when the foot brake is depressed by a considerably large amount, making it significantly easy to perform an operation that needs to be performed while the vehicle is running at a speed equal to or lower than a creeping speed. For example, it becomes easy to perform an operation for performing parallel parking, or an operation for placing the vehicle into a garage.

However, in the creep control apparatus for a vehicle disclosed in Japanese Patent Application Publication No. 05-87236 A, a brake hydraulic pressure sensor is used as the detection portion that detects the operation amount of the foot brake so that whether the creep control can be performed is determined. A condition that a hydraulic pressure detected by the brake hydraulic pressure sensor is equal to or higher than a predetermined value is one of the conditions under which the creep prevention control is started. If the brake hydraulic pressure sensor does not operate properly, it is difficult to perform the creep prevention control (neutral control), and cause the control to return from the creep prevention control (neutral control) to the normal control. Particularly, when the driver attempts to start the vehicle by releasing the brake pedal, timing at which the automatic transmission is shifted to the forward running state may be delayed, and the driver may feel a sense of discomfort. If another sensor is provided in addition to the brake hydraulic pressure sensor in order to address such a problem, a production cost increases.

SUMMARY OF THE INVENTION

It is an object of the invention to provide, without an increase in cost, a control apparatus and control method for an automatic transmission, which appropriately performs control for returning from neutral control to normal control even if a state amount that is required to determine whether control should return from the neutral control to the normal control is erroneously detected, thereby preventing a driver from feeling a sense of discomfort.

A first aspect of the invention relates to a control apparatus, which controls an automatic transmission including an engaging element that is engaged when a vehicle starts to run. The control apparatus includes a first detector which detects braking force of a braking device of the vehicle; a second detector which detects the braking force of the braking device; and a controller which performs neutral control for placing the engaging element in a half-engaged state or a released state, when a vehicle state satisfies a predetermined condition and the vehicle stops while a forward running position is selected, the controller performing control for returning from the neutral control to the normal control based on a signal from a switch that serves as the second detector and that detects whether the braking device is operating, when an abnormality has occurred in the first detector.

With the control apparatus according to the first aspect, in a normal operation time in which the first detector that detects the braking force of the braking device is operating normally, the control returns from the neutral control to the normal control by using the first detector and the second detector. When the first detector is erroneously operating, the control returns from the neutral control to the normal control by using, for example, a brake lamp switch (the second detector) that is usually provided in the vehicle. Thus, the control can reliably return from the neutral control to the normal control. Since the brake lamp switch is used as the second detector in the above example, a fail-safe mechanism for the neutral control can be realized at low cost. As a result, it is possible to provide, without an increase in cost, the control apparatus for an automatic transmission, which appropriately performs the control for returning from the neutral control to the normal control even if the state amount that is required to determine whether the control should return from the neutral control to the normal control is erroneously detected, thereby preventing a driver from feeling a sense of discomfort.

A second aspect of the invention relates to a control apparatus for an automatic transmission including an engaging element that is engaged when a vehicle starts to run. The control apparatus includes a detector which detects braking force of a braking device of the vehicle; a switch that detects whether the braking device is operating; and a controller which performs neutral control for placing the engaging element in a half-engaged state or a released state, when a vehicle state satisfies a predetermined condition and the vehicle stops while a forward running position is selected, the controller performing control for returning from the neutral control to the normal control based on a signal from the switch, when an abnormality has occurred in the detector.

A third aspect of the invention relates to a control method for an automatic transmission. The control method includes detecting braking force of a braking device of the vehicle by using a first detector; detecting the braking force of the braking device by using a second detector that is different from the first detector; determining whether an abnormality has occurred in the first detector; performing neutral control for placing an engaging element in a half-engaged state or a released state, when a vehicle state satisfies a predetermined condition and a vehicle stops while a forward running position is selected; and performing control for returning from the neutral control to the normal control based on a signal from a switch that serves as the second detector, when it is determined that an abnormality has occurred in the first detector.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 2 is an operation chart of the automatic transmission shown in FIG. 1;

FIG. 5 is a table showing operating states of the brake lamp switch 1040 and the depressing force switch 1030;

FIG. 7A and FIG. 7B show a flowchart (2) indicating a control structure of another program performed by the ECU according to the embodiment of the invention;

DETAILED DESCRIPTION OF THE EXEMPLARY EMBODIMENTS

Figure 1:
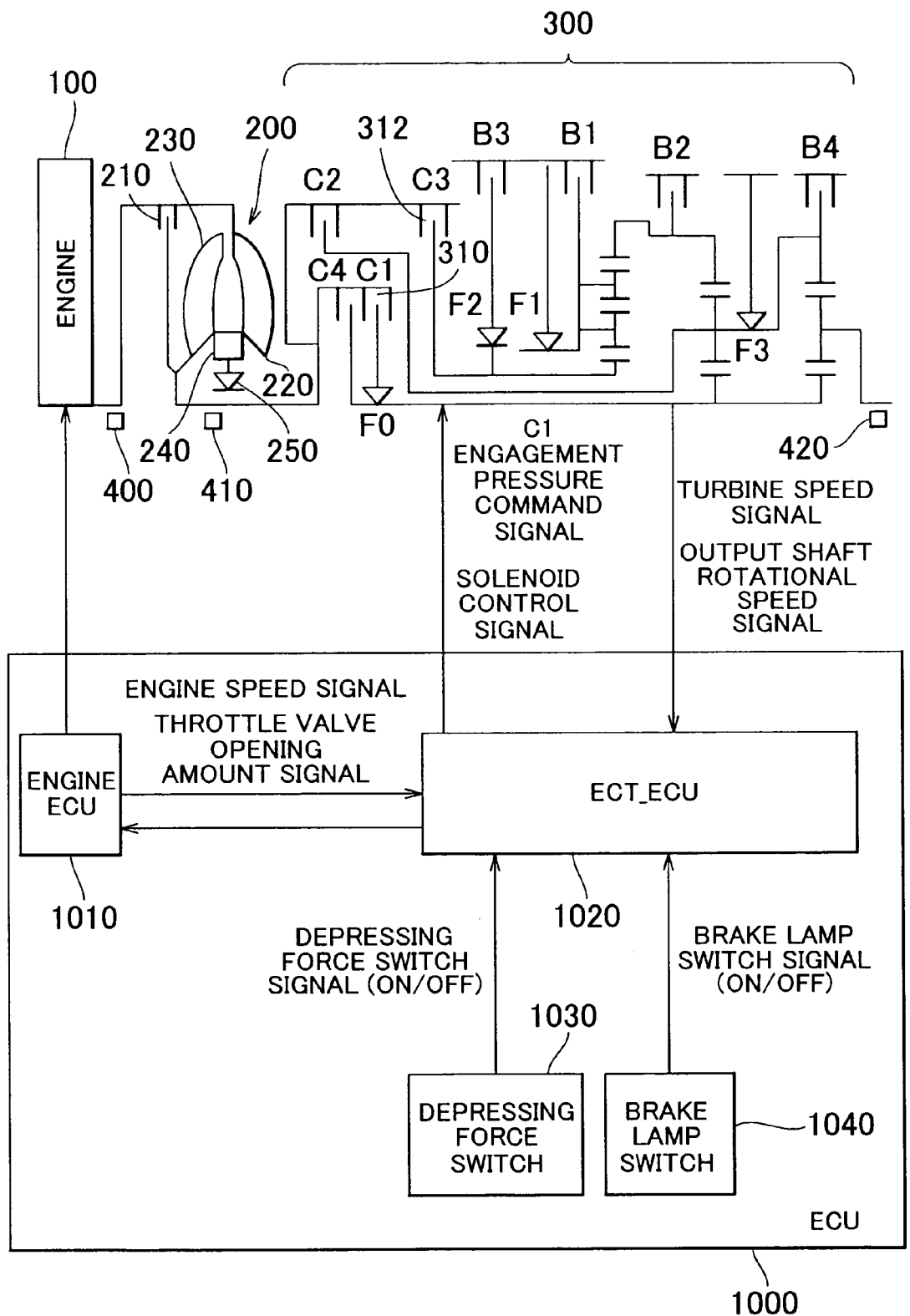
FIG. 1 is a control block diagram of an automatic transmission according to an embodiment of the invention.

Hereafter, an embodiment of the invention will be described with reference to accompanying drawings. In the following description, the same reference numerals will be assigned to the same components. Names and functions of the components having the same reference numerals are also the same. Accordingly, detailed description concerning the components having the same reference numerals will be made only once.

Hereafter, a description will be made concerning a power train of a vehicle including a control apparatus according to the embodiment of the invention. The control apparatus according to the embodiment is realized by an ECU (Electronic Control Unit) 1000 shown in FIG. 1. The following description will be made on the assumption that an automatic transmission is used which includes a planetary gear shifting mechanism and whish is provided with a torque converter serving as a fluid coupling. The automatic transmission to which the invention is applied is not limited to the automatic transmission including the planetary gear shifting mechanism, and the invention may be applied to a continuously variable transmission such as a belt type continuously variable transmission.

The power train of the vehicle including the control apparatus according to the embodiment will be described with reference to FIG. 1. More specifically, the control apparatus according to the embodiment is realized by an ECT (Electronic Controlled Automatic Transmission)_ECU 1020 shown in FIG. 1.

As shown in FIG. 1, the power train of the vehicle includes an engine 100, a torque converter 200, an automatic transmission 300, and the ECU 1000.

An output shaft of the engine 100 is connected to an input shaft of the torque converter 200. The engine 100 is connected to the torque converter 200 via a rotational shaft.

Accordingly, an output shaft rotational speed NE (an engine speed NE) of the engine 100, which is detected by an engine speed sensor 400, is equal to an input shaft rotational speed (a pump speed) of the torque converter 200.

The torque converter 200 includes a lock-up clutch 210 which directly connects the input shaft to an output shaft; a pump impeller 220 located on an input shaft side; a turbine runner 230 located on an output shaft side; and a stator 240 which is provided with a one-way clutch 250 and which has a function of amplifying torque. The torque converter 200 is connected to the automatic transmission 300 via a rotational shaft. An output rotational speed NT (a turbine speed NT) of the torque converter 200 is detected by a turbine speed sensor 410. An output shaft rotational speed NOUT of the automatic transmission 300 is detected by an output shaft rotational speed sensor 420.

FIG. 2 is an operation chart of the automatic transmission 300. The operation chart in FIG. 2 shows a relationship between shift positions and engaged/released states of friction engaging elements, that are, clutch elements (C1 to C4 in FIG. 2), brake elements (B1 to B4 in FIG. 2) and one-way clutch elements (F0 to F3 in FIG. 2). At first speed that is achieved when the vehicle starts to run, each of the clutch element (C1) and the one way clutch elements (F0, F3) is engaged. Among these clutch elements C1 to C4, the clutch element C1 will be referred to as an input clutch 310. The input clutch 310 is also referred to as a forward clutch. As shown in the operation chart in FIG. 2, the input clutch 310 is always engaged when each of the shift speeds at which the vehicle runs forward is achieved, namely, when the shift position is one of the shift positions other than a parking (P) position, a reverse running (R) position, and a neutral (N) position.

The neutral control is performed by releasing the input clutch 310 and placing the input clutch 310 in a predetermined slip state, thereby placing the automatic transmission 300 in a state close to the neutral state. The neutral control is performed when the shift position is the forward running (D) position, and it is determined that a vehicle state satisfies a predetermined condition (an accelerator pedal is released, a brake is applied, a brake master cylinder pressure is equal to or higher than a predetermined value, and a vehicle speed is equal to or lower than a predetermined value) and the vehicle is at a standstill.

The ECU 1000 which controls the power train includes an engine ECU 1010 that controls the engine 100, and the ECT (Electronic Controlled Automatic Transmission)_ECU 1020 that controls the automatic transmission 300.

The ECT_ECU 1020 receives a signal indicating the turbine speed NT from the turbine speed sensor 410, and a signal indicating the output shaft rotational speed NOUT from the output shaft rotational speed sensor 420. Also, the ECT_ECU 1020 receives, from the engine ECU 1010, a signal indicating the engine speed NE detected by the engine speed sensor 400, and a signal indicating a throttle valve opening amount detected by a throttle position sensor.

These speed sensors are provided so as to face teeth of gears for detecting rotation, which are attached to the input shaft of the torque converter 200, the output shaft of the torque converter 200, and an output shaft of the automatic transmission 300. These speed sensors can detect even slight rotation of the input shaft of the torque converter 200, the output shaft of the torque converter 200, and the output shaft of the automatic transmission 300. Each of these speed sensors is a so-called semi-conductor sensor that uses a magnetic resistance element.

The ECT_ECU 1020 is connected to a depressing force switch 1030 which outputs a signal indicating that the depressing force switch 1030 is ON when a force of depressing the brake pedal (depressing force) is equal to or larger than a predetermined value. The depressing force switch 1030 outputs a signal indicating that the depressing force switch 1030 is OFF, when the force of depressing the brake pedal is smaller than the predetermined value. Namely, when the brake pedal has reached a depressing force switch setting position. Also, the ECT_ECU 1020 is connected to a brake lamp switch 1040 which outputs a signal indicating that the brake lamp switch 1040 is ON when a brake lamp is turned ON (namely, the brake lamp switch 1040 is turned ON/OFF in accordance with the ON state/OFF state of the brake lamp). The brake lamp switch 1040 outputs a signal that the brake lamp switch 1040 is OFF, when the brake lamp switch is turned OFF. Whether the brake has been applied can be detected by the brake lamp switch 1040.

Figure 3:
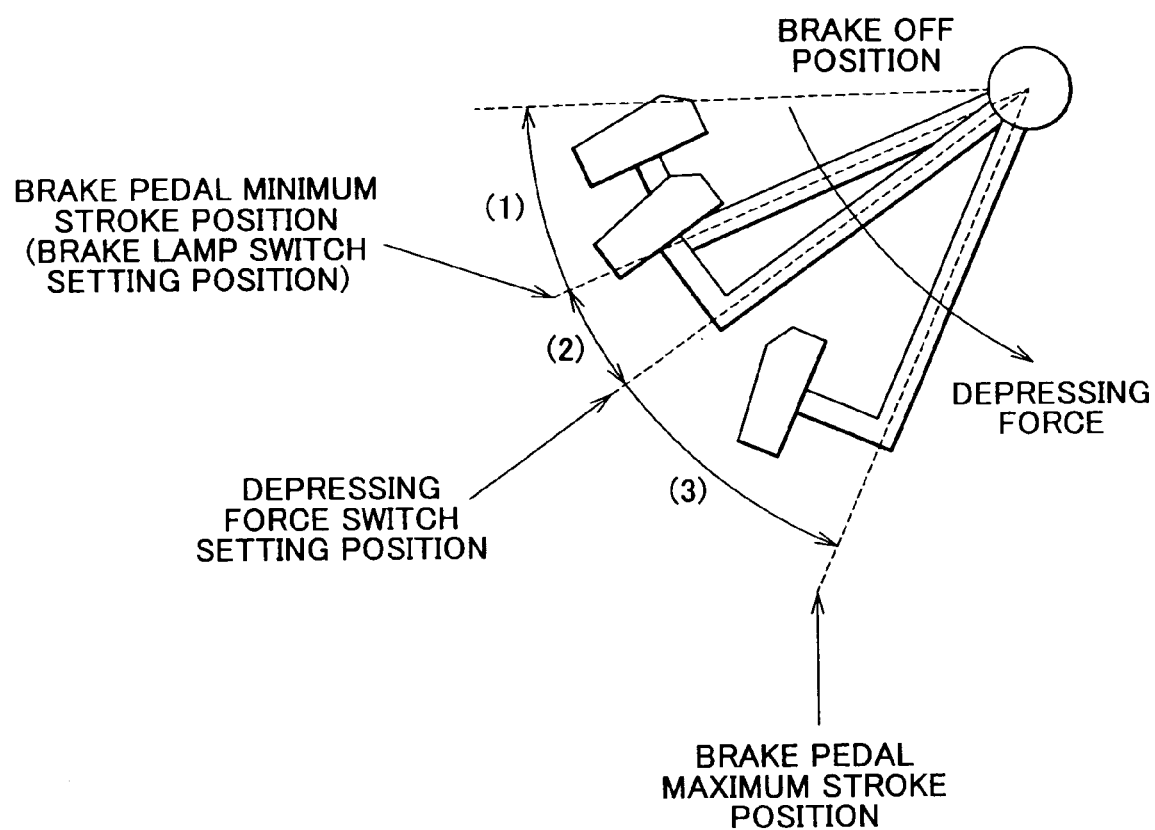
FIG. 3 is a view showing a depressing force switch setting position of a brake pedal.

The depressing force switch setting position will be described with reference to FIG. 3. As shown in FIG. 3, the position of the brake pedal changes from a brake-OFF position to a brake pedal maximum stroke position, as depressing force applied to the brake pedal increases. Namely, as the depressing force applied to the brake pedal increases, the brake pedal moves from the brake-OFF position and reaches a brake pedal minimum stroke position, and then reaches the depressing force switch setting position. The depressing force switch setting position is set to a position corresponding to a depression amount that is larger than a depression amount corresponding to the brake pedal minimum stroke position. If depressing force is further applied to the brake pedal at the depressing force switch setting position, the brake pedal eventually reaches the brake pedal maximum stroke position.

A state realized during a period from when the brake pedal is at the brake-OFF position until when the brake pedal reaches the brake pedal minimum stroke position is a state (1) in FIG. 3. A state realized during a period from when the brake pedal is at the brake pedal minimum stroke position until when the brake pedal reaches the depressing force switch setting position is a state (2) in FIG. 3. A state realized during a period from when the brake pedal is at the depressing force switch setting position until when the brake pedal reaches the brake pedal maximum stroke position is a state (3) in FIG. 3. The brake pedal minimum stroke position matches a position at which the brake lamp switch 1040 is set. If the brake pedal is depressed, the brake pedal moves from the brake-OFF position. When the brake pedal reaches the brake pedal minimum stroke position, the brake lamp switch 1040 is turned ON. If depressing force is further applied to the brake pedal, the brake pedal further moves. When the brake pedal reaches the depressing force switch setting position, the depressing force switch 1030 is turned ON. If depressing force is further applied to the brake pedal, the brake pedal eventually moves to the brake pedal maximum stroke position.

Figure 4:
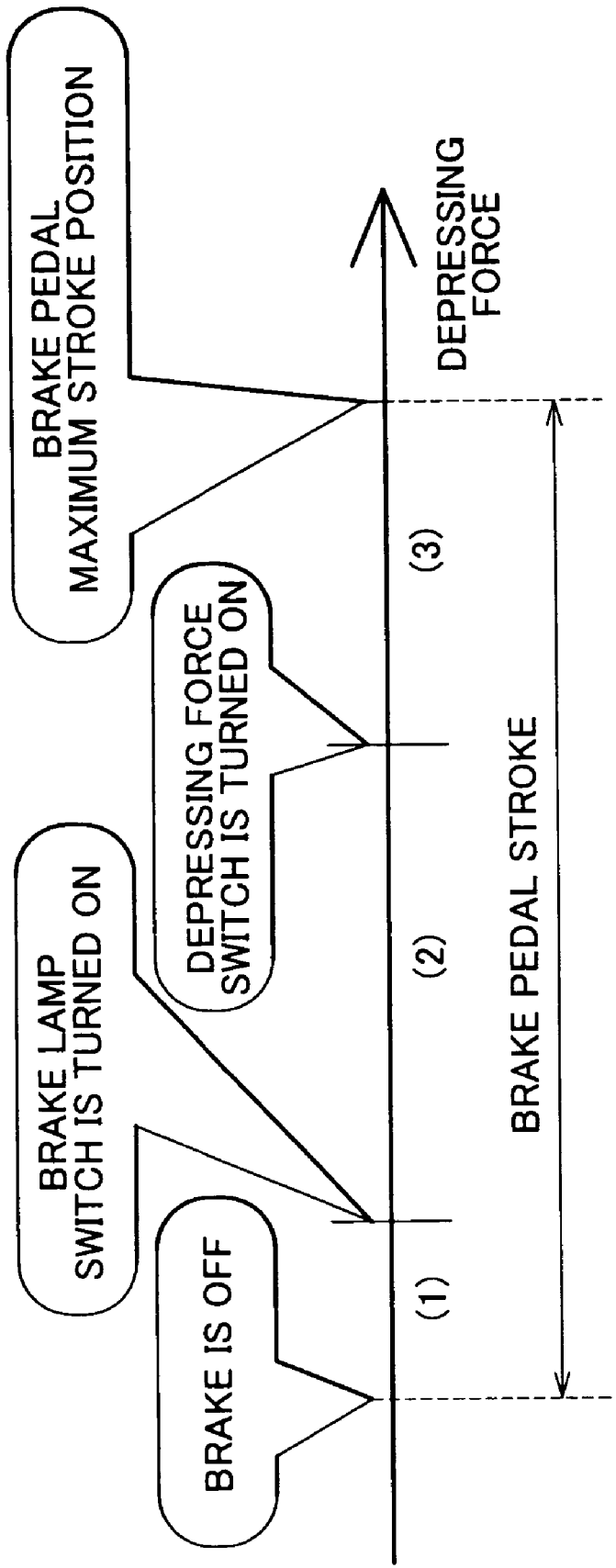
FIG. 4 is a view showing a relationship between a stroke of the brake pedal and positions at which a brake lamp switch 1040 and a depressing force switch 1030 are turned ON/OFF.

FIG. 4 shows the relationship between the stroke of the brake pedal and the positions at which brake lamp switch 1040 and the depressing force switch 1030 are set. States (1), (2), and (3) in FIG. 4 corresponds to the states (1), (2), and (3) in FIG. 3, respectively. In the brake pedal stroke, there are the brake-OFF position, the brake lamp switch-ON position, the depressing force switch-ON position, and the brake pedal maximum stroke position, in the order in which the depressing force increases. Therefore, if depressing force continues to be applied to the brake pedal, first, the brake lamp switch 1040 is turned ON, and then the depressing force switch 1030 is turned ON.

FIG. 5 shows the operating states of the brake lamp switch 1040 and the depressing force switch 1030. States (1), (2), and (3) in FIG. 5 correspond to the states (1), (2), and (3) in FIG. 3, respectively, as in FIG. 4. As shown in FIG. 5, in the state (1), the brake lamp switch 1040 is OFF, and the depressing force switch 1030 is also OFF. In the state (2), the brake lamp switch 1040 is ON, and the depressing force switch 1030 is OFF. In the state (3), the brake lamp switch 1040 is ON, and the depressing force switch 1030 is also ON. Only the combinations of the operating states of the brake lamp switch 1040 and the depressing force switch 1030 shown in FIG. 5 correspond to the normal operation states. If a combination other than the combinations shown in FIG. 5 is realized, an abnormality has occurred in the brake lamp switch 1040 or the depressing force switch 1030.

Figure 6:
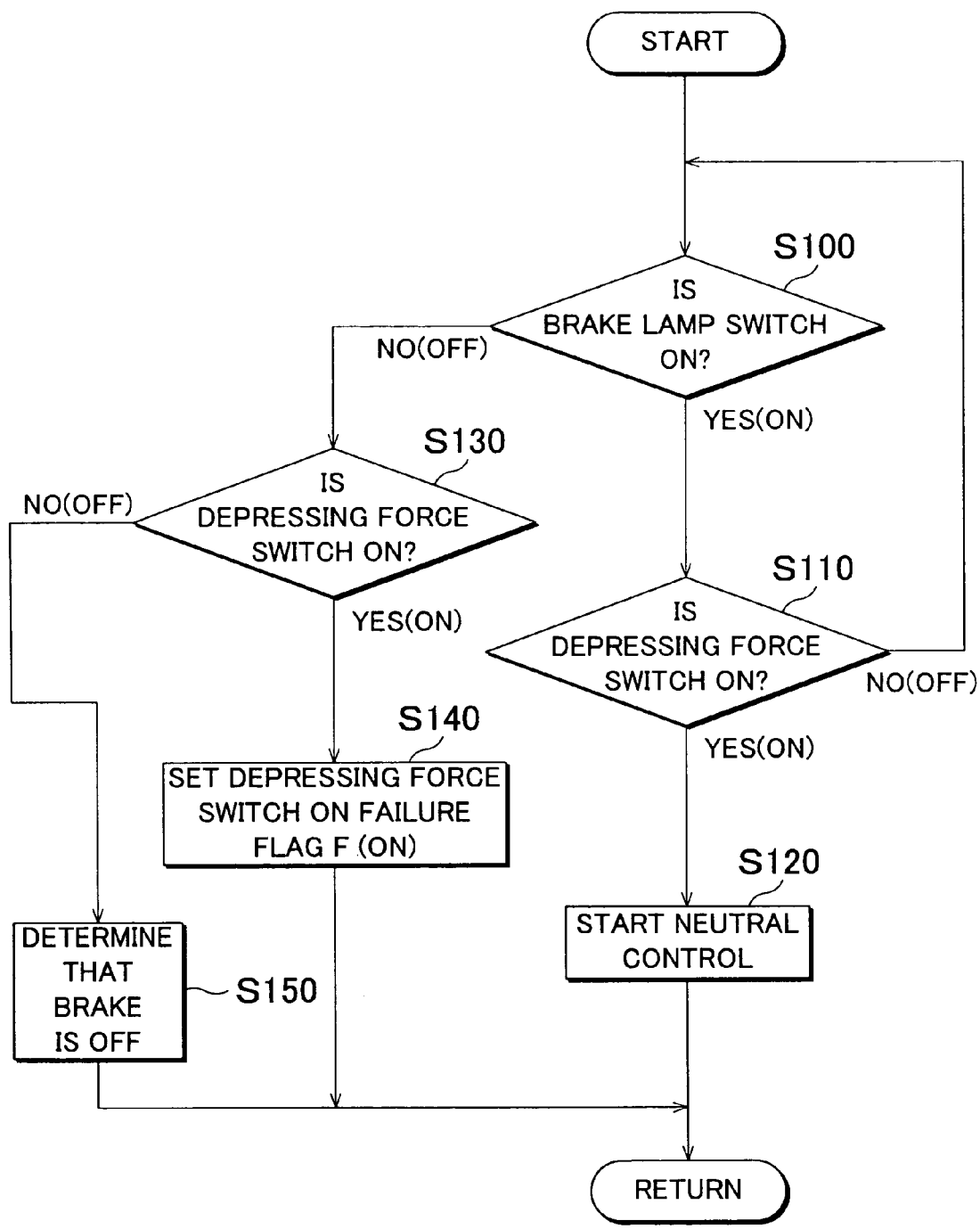
FIG. 6 is a flowchart (1) showing a control structure of a program performed by an ECU according to the embodiment of the invention.
Figure 7A:
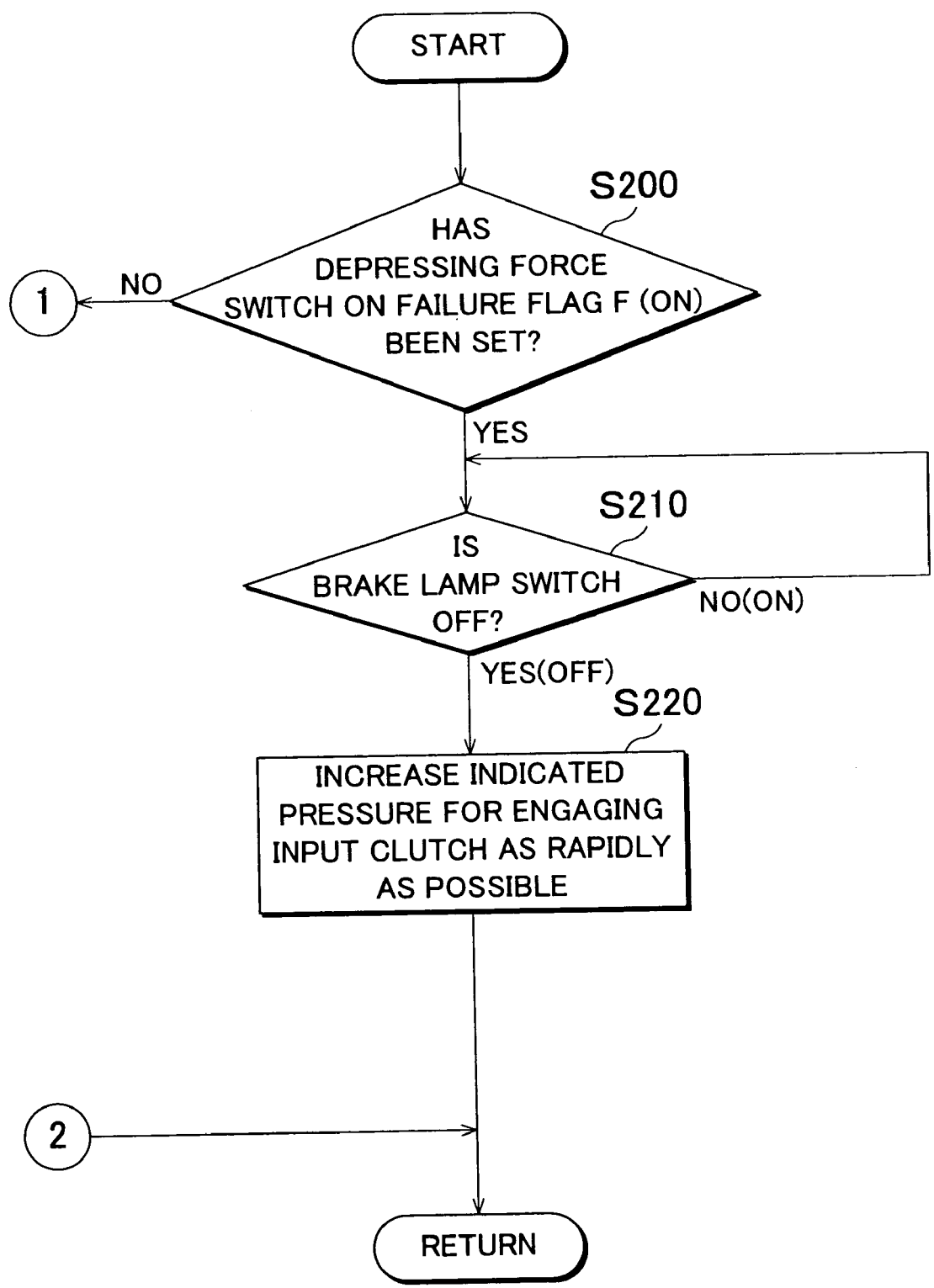

A control structure of a program performed by the ECT_ECU 1020 will be described with reference to FIG. 6 and FIGS. 7A and 7B. FIG. 6 shows a flowchart of control for starting the neutral control, and FIGS. 7A and 7B shows a flowchart of control for returning from the neutral control to the normal control in which the neutral control is not performed (i.e., the neutral control ends).

In step S100, the ECT_ECU 1020 determines whether the brake lamp switch 1040 is ON. The ECT_ECU 1020 makes a determination based on a brake lamp switch signal from the brake lamp switch 1040. If it is determined that the brake lamp switch 1040 is ON ("YES" in step S100), step S110 is performed. If it is determined that the brake lamp switch 1040 is OFF ("NO" in step S100), step S130 is performed.

In step S110, the ECT_ECU 1020 determines whether the depressing force switch 1030 is ON. The ECT_ECU 1020 makes a determination based on a depressing force switch signal from the depressing force switch 1030. If it is determined that the depressing force switch 1030 is ON ("YES" in step S110), step S120 is performed. If it is determined that the depressing force switch 1030 is OFF ("NO" in step S110), step S100 is performed again.

In step S120, the ECT_ECU 1020 starts the neutral control.

In step S130, the ECT_ECU 1020 determines whether the depressing force switch 1030 is ON. If it is determined that the depressing force switch 1030 is ON ("YES" in step S130), step S140 is performed. If it is determined that the depressing force switch 1030 is OFF ("NO" in step S130), step S150 is performed.

In step S140, the ECT_ECU 1020 sets a depressing force switch ON failure flag F (ON) (hereinafter, referred to as a "flag F"). At this time, although the brake lamp switch 1040 is OFF ("NO" in step S100), the depressing force switch 1030 is ON ("YES" in step S130). Since this combination is not shown in FIG. 5, it is determined that a depressing force switch ON failure has occurred, that is, the depressing force switch 1030 is kept ON, although the depressing force switch 1030 is not operating. Therefore, the flag F is set.

In step S150, the ECT_ECU 1020 determines that the brake is not applied (the brake is OFF).

Hereafter, the flowchart shown in FIG. 7 will be described. The ECT_ECU 1020 determines in step S200 whether the flag F has been set. If it is determined that the flag F has been set ("YES" in step S200), step S210 is performed. If it is determined that the flag F has not been set ("NO" in step S200), step S230 is performed.

In step S210, the ECT_ECU 1020 determines whether the brake lamp switch 1040 is OFF. If it is determined that the brake lamp switch 1040 is OFF ("YES" in step S210), step S220 is performed. If it is determined that the brake lamp switch 1040 is ON ("NO" in step S210), step S210 is performed again.

In step S220, the ECT_ECU 1020 increases a commanded pressure for engaging the input clutch 310 as rapidly as possible. The fact that the flag F has been set shows that a failure has occurred in the depressing force switch 1030, that is, the depressing force switch 1030 is kept ON, although the depressing force switch 1030 is not operating. Even if the brake pedal is released and moves from the brake pedal maximum stroke position to the depressing force switch setting position in FIG. 3, the depressing force switch 1030 is kept ON. When the brake pedal is further released and reaches the brake pedal minimum stroke position, the brake lamp switch 1040 is turned OFF. Usually, the control for returning from the neutral control to the normal control is performed when the depressing force switch 1030 is turned OFF. However, if the control for returning from the neutral control to the normal control is performed after the brake lamp switch 1040 is turned OFF, timing at which the control returns from the neutral control to the normal control is delayed. Therefore, the commanded pressure for engaging the input clutch 310 is increased as rapidly as possible so that the control is caused to return from the neutral control to the normal control promptly.

In step S230, the ECT_ECU 1020 determines whether the depressing force switch 1030 has been turned OFF. If it is determined that the depressing force switch 1030 has been turned OFF ("YES" in step S230), step S240 is performed. If it is determined that the depressing force switch 1030 has not been turned OFF ("NO" in step S230), step S230 is performed again.

In step S240, the ECT_ECU 1020 stores timing t (1) at which the depressing force switch 1030 is turned OFF.

In step S250, the ECT_ECU 1020 determines whether the brake lamp switch 1040 has been turned OFF. If it is determined that the brake lamp switch 1040 has been turned OFF ("YES" in step S250), step S260 is performed. If it is determined that the brake lamp switch 1040 has not been turned OFF ("NO" in step S250), step S250 is performed again.

In step S260, the ECT_ECU 1020 stores timing t (2) at which the brake lamp switch 1040 is turned OFF.

In step S270, the ECT_ECU 1020 performs a computation according to an equation, $\Delta t = \{t(2) - t(1)\}$. In step S280, the ECT_ECU 1020 calculates an increasing rate $\alpha$ of the commanded pressure for engaging the input clutch 310. The increasing rate $\alpha$ is calculated according to an equation, $\alpha = f(\Delta t)$. Here, "f" in this equation is a function for calculating the increasing rate $\alpha$ of the commanded pressure for engaging the input clutch 310 based on a time interval $\Delta t$ between the timing at which the depressing force switch 1030 is turned OFF and the timing at which the brake lamp switch 1040 is turned OFF, as shown in FIG. 8.

Figure 8:
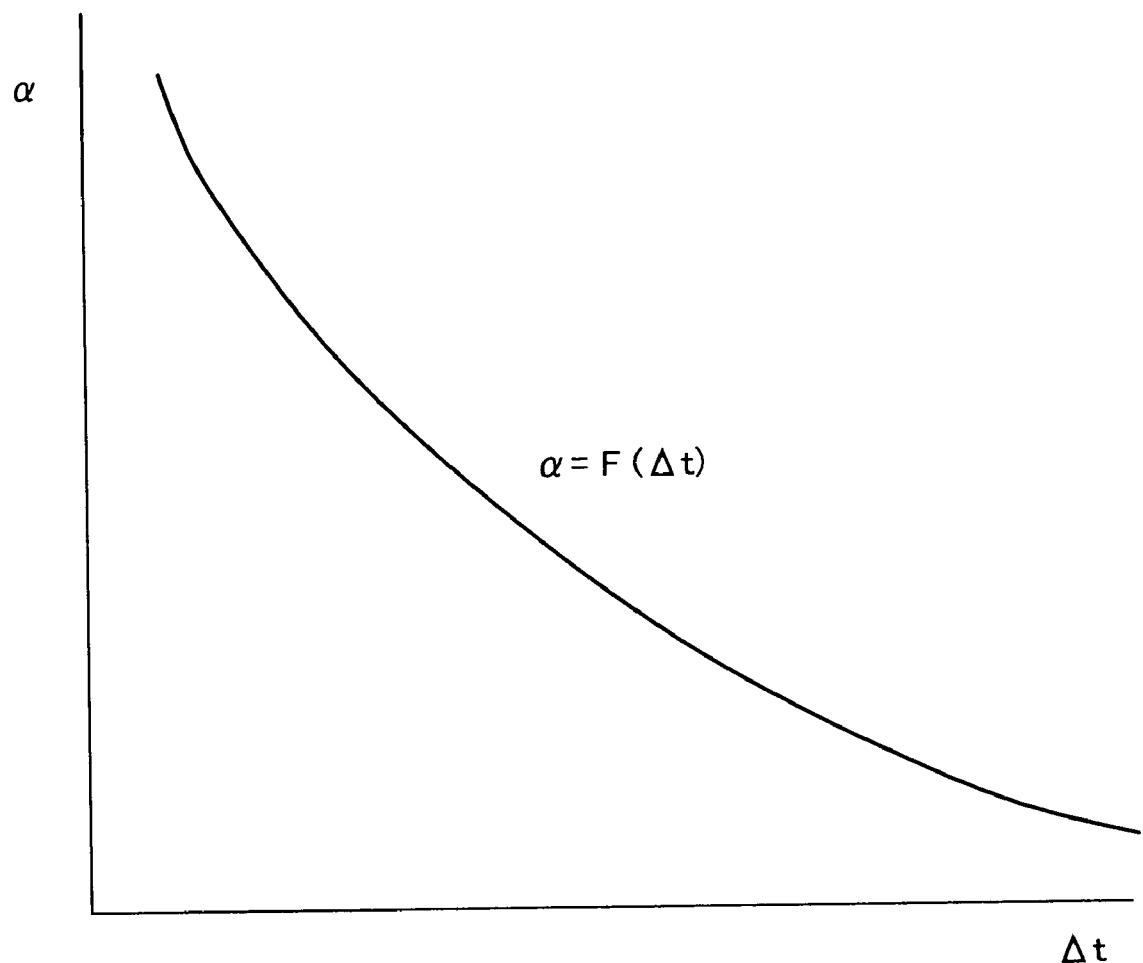
FIG. 8 is a graph showing a function for obtaining an increasing rate of hydraulic pressure at which a friction engaging element is engaged.

As shown in FIG. 8, based on the function "f", as the time interval $\Delta t$ increases, the increasing rate $\alpha$ decreases, and as the time interval $\Delta t$ decreases, the increasing rate $\alpha$ increases. Note that, the function "f" shown in FIG. 8 is just an example, and the function used in the invention is not limited to the function "f".

In step S290, the ECT_ECU 1020 increases the commanded pressure for engaging the input clutch 310 at the increasing rate $\alpha$.

Hereafter, an operation of the control apparatus for the automatic transmission according to the embodiment will be described based on the structure and the flowchart described so far.

[Start of Neutral Control]

When the brake lamp switch 1040 is ON ("YES" in step S100), and the depressing force switch 1030 is turned ON ("YES" in step S110), the neutral control is started in step S120. At this time, the input clutch 310 (clutch element C1) is disengaged so that torque from the engine 100 is not transmitted to the automatic transmission 300.

[Detection of Failure in Depressing Force Switch 1030]

When the brake lamp switch 1040 is OFF ("NO" in step S100), and the depressing force switch 1030 is turned ON ("YES" in step S130), it is determined that a failure has occurred in the depressing force switch 1030, that is, the depressing force switch 1030 is kept ON, although the depressing force switch 1030 is not operating. Therefore, the flag F is set in step S140. Namely, as shown in FIG. 3, since the depressing force switch setting position is set to a position on the brake pedal maximum stroke position side, the depressing force switch 1030 is supposed to be turned ON after the brake lamp switch 1040, which is turned ON when the brake pedal reaches the brake pedal minimum stroke position, is turned ON. However, if the brake lamp switch 1040 is OFF ("NO" in step S100) and the depressing force switch 1030 is turned ON ("YES" in step S130), a failure has occurred in the depressing force switch 1030, that is, the depressing force switch 1030 is kept ON, although the depressing force switch 1030 is not operating. At this time, the flag F is set in step S140.

[Return from Neutral Control: Abnormal Operation Time]

If the depressing force switch 1030 does not detect braking force of the brake although the depressing force switch 1030 is ON, it is determined that a depressing force switch ON failure has occurred, and the flag F is set ("YES" in step S200). In this case, if the driver releases the brake pedal, the brake lamp switch 1040 is turned OFF ("YES" in step S210) even if the depressing force switch 1030 is kept ON. In such a case, the commanded pressure for engaging the input clutch 310 is increased as rapidly as possible in step S220.

In the normal operation time, when the depressing force switch 1030 is turned OFF, the control returns from the neutral control to the normal control. However, since the depressing force switch 1030 is kept ON and is not turned OFF, the control for returning from the neutral control to the normal control is started at timing later than normal timing at which the brake lamp switch 1040 is turned OFF. Therefore, the commanded pressure for engaging the input clutch 310 is increased as rapidly as possible so that the driver does not feel a sense of discomfort.

[Return from Neutral Control: Normal Operation Time]

When the flag F has not been set ("NO" in step S200), and the depressing force switch 1030 is turned OFF ("YES" in step S230), timing t (1) at which the depressing force switch is turned OFF is stored in step S240. If the brake pedal is further released, the brake lamp switch 1040 is turned OFF ("YES" in step S250). Timing t (2) at which the brake lamp switch 1040 is turned OFF is stored in step S260.

The computation is performed according to the equation, $\Delta t = \{t(2) - t(1)\}$ in step S270. Then, the increasing rate $\alpha$ of the commanded pressure for engaging the input clutch 310 is calculated by using the function "f" shown in FIG. 8, according to the equation, $a = f(\Delta t)$ in step S280. The commanded pressure for engaging the input clutch 310 is increased at the increasing rate $\alpha$, and the control returns from the neutral control to the normal control in step S290.

Figure 9:
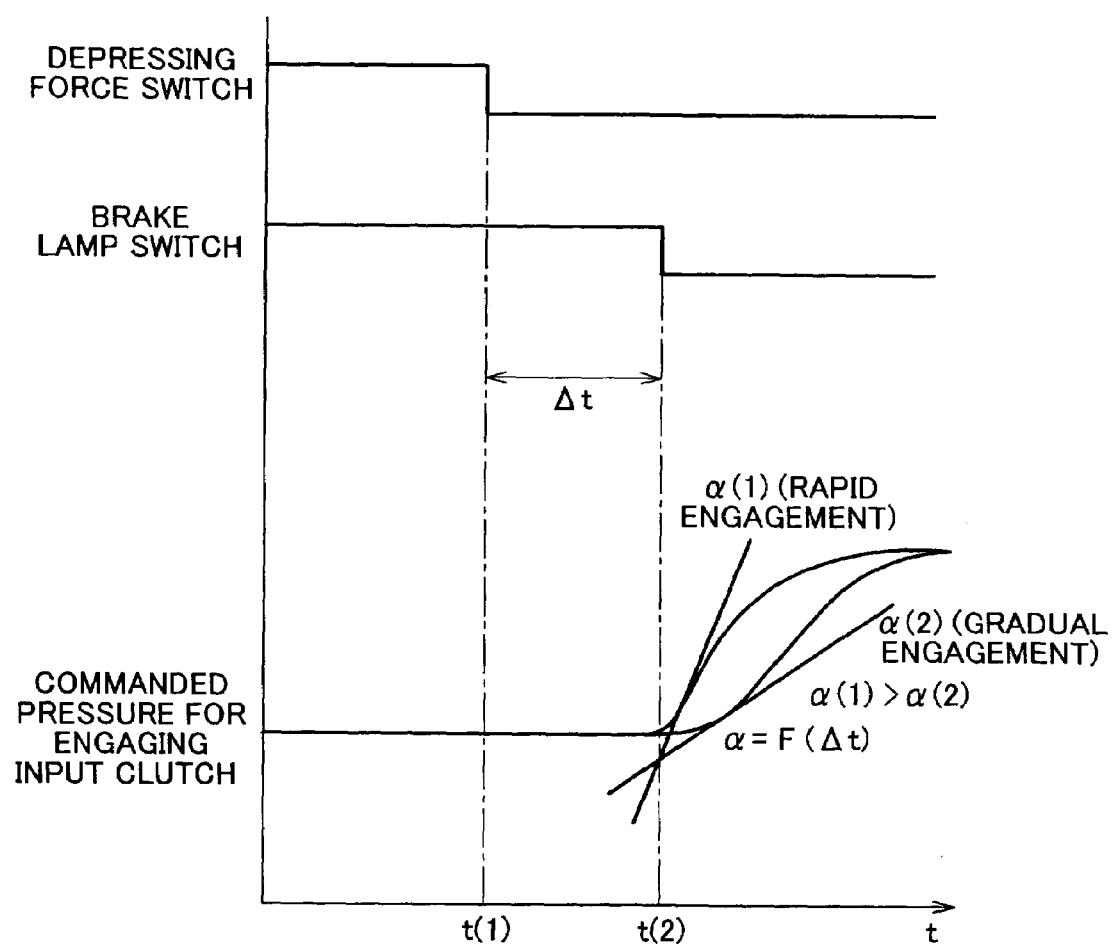
FIG. 9 is a timing chart used when control returns from neutral control to normal control.

A timing chart showing a returning mode in which the control returns from the neutral control to the normal control in the normal operation time will be described with reference to FIG. 9. The depressing force switch 1030 is turned OFF at timing t (1), and the brake lamp switch 1040 is turned OFF at timing t (2). The time interval $\Delta t$ between timing t (2) and timing t (1) is calculated. The increasing rate $\alpha$ of the commanded pressure for engaging the input clutch 310 is calculated based on the time interval $\Delta t$ and the function "f" shown in FIG. 8, according to the equation, $a = f(\Delta t)$. As shown in FIG. 9, the increasing rate $\alpha$ of the commanded pressure for engaging the input clutch 310 indicates a rate of increase in the commanded pressure for engaging the input clutch 310 from timing t (2). For example, as shown in FIG. 9, the increasing rate $\alpha$ (1) is higher than the increasing rate $\alpha$ (2). In the case of the increasing rate $\alpha$ (1), the input clutch 310 is engaged rapidly. In the case of the increasing rate $\alpha$ (2), the input clutch 310 is engaged gradually. Namely, the function "f" is set such that, as the time interval $\Delta t$ increases, the input clutch 310 is engaged more gradually, and as the time interval $\Delta t$ decreases, the input clutch 310 is engaged more rapidly.

As described so far, with the control apparatus for an automatic transmission according to the embodiment, the depressing force switch and the brake lamp switch are provided, and starting of the neutral control and return from the neutral control to the normal control are controlled by the depressing force switch in the normal operation time. When a failure has occurred in the depressing force switch, the control for returning from the neutral control to the normal control is started when the brake lamp switch is turned OFF, and the commanded pressure for engaging the input clutch is increased as rapidly as possible. Thus, the driver does not feel a sense of discomfort, even if timing at which the control returns from the neutral control to the normal control is delayed. On the other hand, when both the depressing force switch and the brake lamp switch are operating properly, a releasing mode in which the brake is released (e.g. a speed at which the brake pedal is released) is determined based on the time interval between when the depressing force switch is turned OFF and when the brake lamp switch is turned OFF. The commanded pressure for engaging the input clutch is changed based on the releasing mode. When the brake pedal is released rapidly, the input clutch is engaged rapidly so that the vehicle starts to run promptly. On the other hand, when the brake pedal is released gradually, the input clutch is engaged gradually so that the vehicle starts to run gradually. With such an operation, it is possible to prevent the driver from feeling a sense of discomfort.

Figure 12:
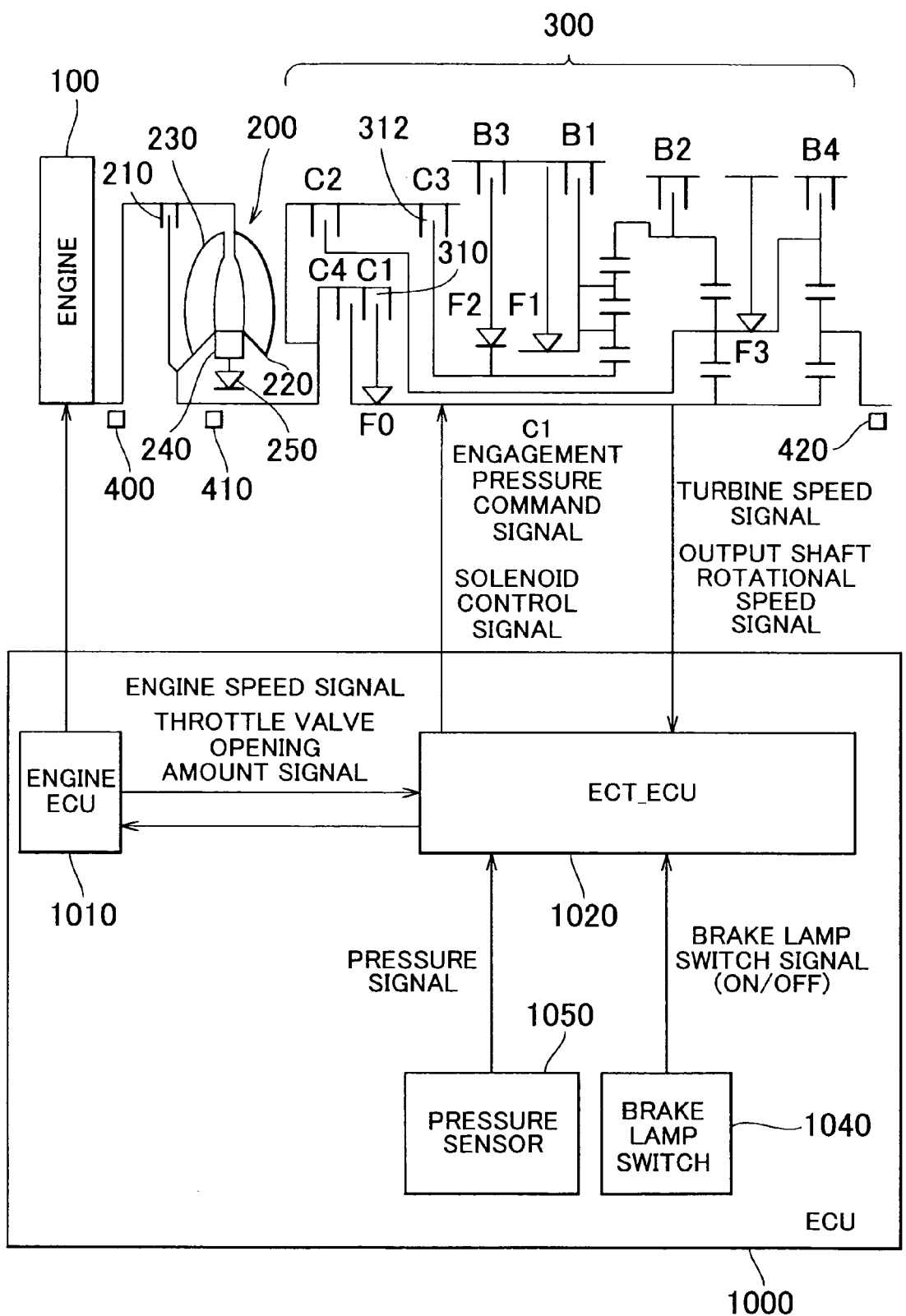
FIG. 12 is a control block diagram of an automatic transmission according to another embodiment of the invention.

Instead of the depressing force sensor which detects the depressing force applied to the brake pedal, a sensor 1050 which detects a master cylinder pressure of the brake as shown in FIG. 12 may be used.

FIRST MODIFIED EXAMPLE

Figure 10:
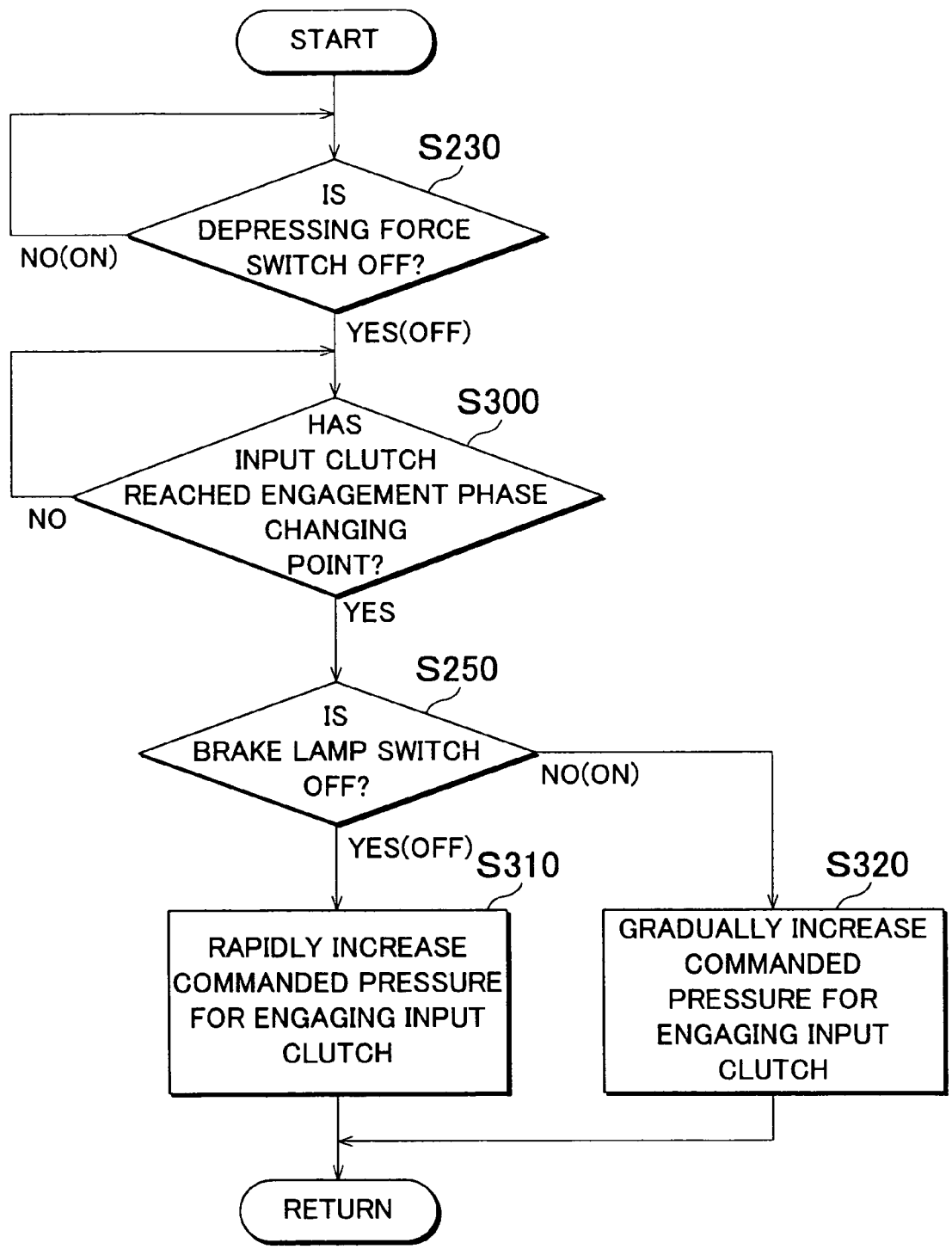
FIG. 10 is a flowchart showing a control structure of a program (that is used when the control returns from the neutral control to the normal control) performed by the ECU according to a first modified example of the embodiment.

Hereafter, timing at which the control returns from the neutral control to the normal control will be described with reference to FIG. 10. In FIG. 10, the same step numbers are assigned to the same steps as those in the flowchart in FIG. 7. The processes in the steps having the same step numbers are also the same. Accordingly, the detailed description concerning the steps having the same step numbers will not be made here. Although not shown in FIG. 10, steps S200 to S220 shown in FIG. 7 are performed also in the first modified example. FIG. 10 shows the steps performed after a negative determination is made in step S200 in FIG. 7.

In step S300, the ECT_ECU 1020 determines whether the input clutch 310 has reached an engagement phase changing point. If it is determined that the input clutch 310 has reached the engagement phase changing point ("YES" in step S300), step S250 is performed. If it is determined that the input clutch 310 has not reached the engagement phase changing point ("NO" in step S300), step S300 is performed again.

In step S310, the ECT_ECU 1020 rapidly increases the commanded pressure for engaging the input clutch 310. In step S320, the ECT_ECU 1020 gradually increases the commanded pressure for engaging the input clutch 310.

The input clutch 310 is engaged promptly, after the brake lamp switch 1040 is turned OFF when the input clutch 310 reaches the engagement phase changing point. Accordingly, the vehicle can start to run promptly according to the intention of the driver. Meanwhile, when the brake lamp switch is turned ON, the clutch is engaged gradually. Thus, the vehicle can start to run with a little shock.

SECOND MODIFIED EXAMPLE

Figure 11:
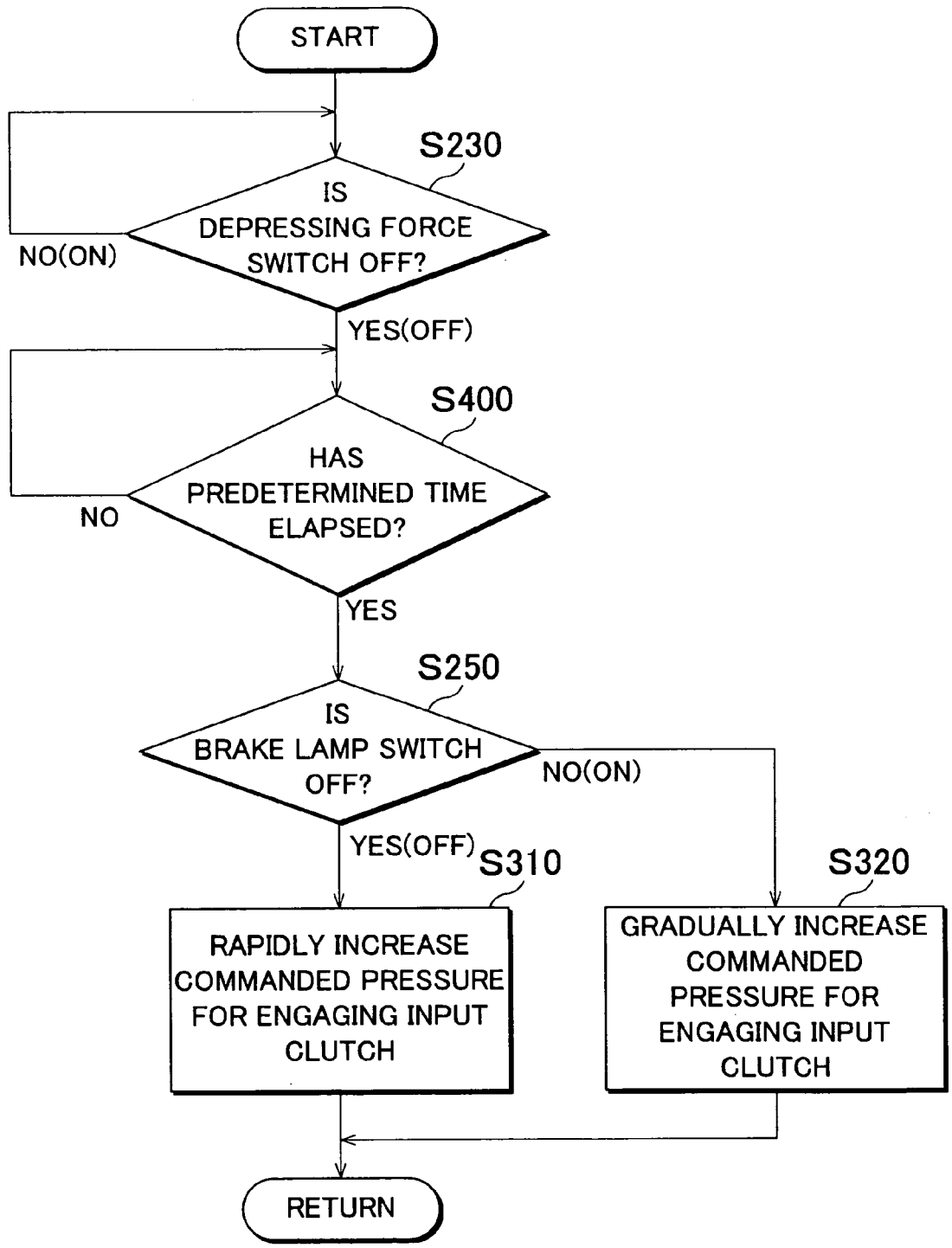
FIG. 11 is a flowchart showing a control structure of a program (that is used when the control returns from the neutral control to the normal control) performed by the ECU according to a second modified example of the embodiment.

Hereafter, timing at which the control returns from the neutral control to the normal control will be described with reference to FIG. 11. In FIG. 11, the same step numbers are assigned to the same steps as those in the flowchart in FIG. 7. The processes in the steps having the same step numbers are also the same. Accordingly, the detailed description concerning the steps having the same step numbers will not be made here. Although not shown in FIG. 11, steps S200 to s220 in FIG. 7 are performed also in the second modified example. FIG. 11 shows the steps performed after a negative determination is made in step S200 in FIG. 7.

In step S400, the ECT_ECU 1020 determines whether a predetermined time has elapsed since the fact that the depressing force switch 1030 is turned OFF is detected. If the predetermined time has elapsed since the fact that the depressing force switch 1030 is turned OFF is detected ("YES" in step S400), step S250 is performed. On the other hand, if the predetermined time has not elapsed since the fact that the depressing force switch 1030 is turned OFF is detected ("NO" in step S400), step S400 is performed again.

The input clutch 310 is engaged promptly, after the brake lamp switch 1040 is turned OFF when the predetermined time has elapsed since the fact the depressing force switch 1030 is turned OFF is detected. Thus, the vehicle can start to run promptly according to the intention of the driver. Meanwhile, when the brake lamp switch 1040 is turned ON, the clutch is engaged gradually. Thus, the vehicle can start to run with a little shock.

The embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

What is claimed is:

1. A control apparatus for an automatic transmission including an engaging element that is engaged when a vehicle starts to run, comprising:
   a first detector which detects braking force of a braking device of the vehicle;
   a second detector which detects the braking force of the braking device; and
   a controller which performs neutral control for placing the engaging element in a half-engaged state or a released state, when a vehicle state satisfies a predetermined condition and the vehicle stops while a forward running position is selected, the controller performing control for returning from the neutral control to normal control based on a signal from a switch that serves as the second detector and that detects whether the braking device is operating, when an abnormality has occurred in the first detector,
   wherein, when the first detector is operating normally, the controller sets a returning mode in which control returns from the neutral control to the normal control based on a releasing mode in which the braking device is released, the releasing mode being determined based on the braking force of the braking device detected by the first detector and the signal from the switch, and the controller performs the control for returning from the neutral control to the normal control based on the set returning mode,
   wherein the controller determines first release timing at which the braking device is released, based on the braking force detected by the first detector, determines second release timing at which the braking device is released, based on the braking force detected by the second detector, sets the returning mode based on a speed at which the braking device is released, the speed being calculated based on the first release timing and the second release timing, and performs the control for returning from the neutral control to the normal control based on the set returning mode.

2. The control apparatus according to claim 1, wherein, when an abnormality has occurred in the first detector, the controller engages the engaging element when control returns from the neutral control to the normal control more rapidly than in the case where an abnormality has not occurred in the first detector.

3. The control apparatus according to claim 1, wherein the first detector detects the braking force of the braking device based on an amount of stroke of a brake pedal.

4. The control apparatus according to claim 1, wherein the first detector detects the braking force of the braking device based on master cylinder pressure of the brake.

5. The control apparatus according to claim 1, wherein the first detector detects the braking force of the braking device based on depressing force applied to a brake pedal.

6. A control apparatus for an automatic transmission including an engaging element that is engaged when a vehicle starts to run, comprising:
   a first detector which detects braking force of a braking device of the vehicle;
   a second detector which detects the braking force of the braking device; and
   a controller which performs neutral control for placing the engaging element in a half-engaged state or a released state, when a vehicle state satisfies a predetermined condition and the vehicle stops while a forward running position is selected, the controller performing control for returning from the neutral control to normal control based on a signal from a switch that serves as the second detector and that detects whether the braking device is operating, when an abnormality has occurred in the first detector,
   wherein, when the first detector is operating normally, the controller sets a returning mode in which control returns from the neutral control to the normal control based on a releasing mode in which the braking device is released, the releasing mode being determined based on the braking force of the braking device detected by the first detector and the signal from the switch, and the controller performs the control for returning from the neutral control to the normal control based on the set returning mode, wherein the controller sets the returning mode based on time required to engage the engaging element that is engaged when the control returns from the neutral control to the normal control.

7. A control apparatus for an automatic transmission including an engaging element that is engaged when a vehicle starts to run, comprising:
   a first detector which detects braking force of a braking device of the vehicle;
   a second detector which detects the braking force of the braking device; and
   a controller which performs neutral control for placing the engaging element in a half-engaged state or a released state, when a vehicle state satisfies a predetermined condition and the vehicle stops while a forward running position is selected, the controller performing control for returning from the neutral control to normal control based on a signal from a switch that serves as the second detector and that detects whether the braking device is operating, when an abnormality has occurred in the first detector,
   wherein, when the first detector is operating normally, the controller sets a returning mode in which control returns from the neutral control to the normal control based on a releasing mode in which the braking device is released, the releasing mode being determined based on the braking force of the braking device detected by the first detector and the braking force of the braking device that is detected according to the signal from the switch, and the controller performs the control for returning from the neutral control to the normal control based on the set returning mode,
   wherein the controller determines first release timing at which the braking device is released, based on the braking force detected by the first detector, determines second release timing at which the braking device is released, based on the braking force detected by the second detector, sets the returning mode based on a speed at which the braking device is released, the speed being calculated based on the first release timing and the second release timing, and performs the control for returning from the neutral control to the normal control based on the set returning mode.

8. A control apparatus for an automatic transmission including an engaging element that is engaged when a vehicle starts to run, comprising:
   a first detector which detects braking force of a braking device of the vehicle;
   a second detector which detects the braking force of the braking device; and
   a controller which performs neutral control for placing the engaging element in a half-engaged state or a released state, when a vehicle state satisfies a predetermined condition and the vehicle stops while a forward running position is selected, the controller performing control for returning from the neutral control to normal control based on a signal from a switch that serves as the second detector and that detects whether the braking device is operating, when an abnormality has occurred in the first detector,
   wherein, when the first detector is operating normally, the controller sets a returning mode in which control returns from the neutral control to the normal control based on a releasing mode in which the braking device is released, the releasing mode being determined based on the braking force of the braking device detected by the first detector and the braking force of the braking device that is detected according to the signal from the switch, and the controller performs the control for returning from the neutral control to the normal control based on the set returning mode,
   wherein the controller sets the returning mode based on time required to engage the engaging element that is engaged when the control returns from the neutral control to the normal control.

9. A control apparatus for an automatic transmission including an engaging element that is engaged when a vehicle starts to run, comprising:
   first detecting means for detecting braking force of a braking device of the vehicle;
   second detecting means for detecting the braking force of the braking device; and
   control means for performing neutral control for placing the engaging element in a half-engaged state or a released state, when a vehicle state satisfies a predetermined condition and the vehicle stops while a forward running position is selected; and for performing control for returning from the neutral control to normal control based on a signal from a switch that serves as the second detecting means and that detects whether the braking device is operating, when an abnormality has occurred in the first detecting means,
   wherein, when the first detecting means is operating normally, the control means sets a returning mode in which control returns from the neutral control to the normal control based on a releasing mode in which the braking device is released, the releasing mode being determined based on the braking force of the braking device detected by the first detecting means and the signal from the switch, and the control means performs the control for returning from the neutral control to the normal control based on the set returning mode,
   wherein the control means determines first release timing at which the braking device is released, based on the braking force detected by the first detecting means, determines second release timing at which the braking device is released, based on the braking force detected by the second detecting means, sets the returning mode based on a speed at which the braking device is released, the speed being calculated based on the first release timing and the second release timing, and performs the control for returning from the neutral control to the normal control based on the set returning mode.

10. A control apparatus for an automatic transmission including an engaging element that is engaged when a vehicle starts to run, comprising:
    a detector which detects braking force of a braking device of the vehicle;
    a switch for detecting whether the braking device is operating; and
    a controller which performs neutral control for placing the engaging element in a half-engaged state or a released state, when a vehicle state satisfies a predetermined condition and the vehicle stops while a forward running position is selected, the controller performing control for returning from the neutral control to normal control based on a signal from the switch, when an abnormality has occurred in the detector,
    wherein, when the detector is operating normally, the controller sets a returning mode in which control returns from the neutral control to the normal control based on a releasing mode in which the braking device is released, the releasing mode being determined based on the braking force of the braking device detected by the detector and the signal from the switch, and the controller performs the control for returning from the neutral control to the normal control based on the set returning mode, wherein the controller determines first release timing at which the braking device is released, based on the braking force detected by the detector, determines second release timing at which the braking device is released, based on the signal from switch, sets the returning mode based on a speed at which the braking device is released, the speed being calculated based on the first release timing and the second release timing, and performs the control for returning from the neutral control to the normal control based on the set returning mode.

11. A control method for an automatic transmission, comprising:

detecting braking force of a braking device of the vehicle by using a first detector;

detecting the braking force of the braking device by using a second detector that is different from the first detector;

determining whether an abnormality has occurred in the first detector;

performing neutral control for placing an engaging element in a half-engaged state or a released state, when a vehicle state satisfies a predetermined condition and a vehicle stops while a forward running position is selected; and performing control for returning from the neutral control to normal control based on a signal from a switch that serves as the second detector, when it is determined that an abnormality has occurred in the first detector, wherein, when the first detector is operating normally, a returning mode in which control returns from the neutral control to the normal control is set based on a releasing mode in which the braking device is released, the releasing mode being determined based on the braking force of the braking device detected by the first detector and the signal from the switch, and the control for returning from the neutral control to the normal control is performed based on the set returning mode, wherein first release timing at which the braking device is released is determined, based on the braking force detected by the first detector, second release timing at which the braking device is released is determined, based on the braking force detected by the second detector, the returning mode is set based on a speed at which the braking device is released, the speed being calculated based on the first release timing and the second release timing, and the control for returning from the neutral control to the normal control is performed based on the set returning mode.

* * * * *